(12) United States Patent
Yu

(10) Patent No.: US 6,419,234 B1
(45) Date of Patent: Jul. 16, 2002

(54) OIL SEALING RING

(76) Inventor: Xiuming Yu, Beiduquicun, Zhangdaxiang, Feixiangxian, Handan City, Hebei, 057550 (CN)

( * ) Notice: Subject to any disclaimer, the term of this patent is extended or adjusted under 35 U.S.C. 154(b) by 0 days.

(21) Appl. No.: 09/336,268

(22) Filed: Jun. 19, 1999

(30) Foreign Application Priority Data

Dec. 19, 1995 (CN) .......................................... 95118969 A
Dec. 31, 1995 (CN) .......................................... 95250580 U
Aug. 25, 1996 (CN) .......................................... 96111918 A
Oct. 2, 1996 (CN) .......................................... 96113144 A

(51) Int. Cl.⁷ ................................................. F16J 9/20
(52) U.S. Cl. ...................... 277/434; 277/435; 277/489; 277/490; 277/492
(58) Field of Search ................................ 277/434, 435, 277/447, 467, 489, 490, 492

(56) References Cited

U.S. PATENT DOCUMENTS

| 1,418,918 A | * | 6/1922 | Hall | 277/489 |
| 2,349,903 A | * | 5/1944 | Fall | 277/434 |
| 2,465,896 A | * | 3/1949 | Marien | 277/467 |
| 4,040,637 A | * | 8/1977 | McCormick | 277/434 |
| 4,911,455 A | | 3/1990 | Edlund | 277/165 |
| 5,618,048 A | * | 4/1997 | Moriarty | 277/434 |

FOREIGN PATENT DOCUMENTS

| CN | 8520361 U | 5/1986 |
| CN | 2203362 Y | 7/1995 |

OTHER PUBLICATIONS

International Search Report for PCT/CN96/00110—Mar. 27, 1997.

* cited by examiner

*Primary Examiner*—Anthony Knight
*Assistant Examiner*—Enoch E. Peavey
(74) *Attorney, Agent, or Firm*—Fish & Neave

(57) ABSTRACT

The present invention relates to an oil sealing ring, especially that used in piston of internal combustion engine or compressor. This oil sealing ring comprises a base ring (2) with a split. An elastic ring (3) is provided in the inner circumference surface of the base ring. A radially outward annular flange (18) is provided in the outer circumference surface of the base ring. An axially upward annular projecting part (19) is provided in the area beyond the outer circumference surface of the projecting part (19). The splits of said disc ring (1) and said base ring (2) are respectively staggered from each other. This oil sealing ring can effectively prevent the leakage of the oil and the gas.

15 Claims, 4 Drawing Sheets

_US 6,419,234 B1_

OIL SEALING RING

TECHNICAL FIELD

The present invention relates to an oil sealing ring, especially that used in internal combustion engine piston or compressor piston, Which comprises a base ring with a split and an elastic ring provided on the inner circumferential surface of the base ring

BACKGROUND OF THE INVENTION

There are several kinds of oil sealing ring which have been used in the piston of reciprocating internal combustion engine, one kind of them is provided with a flange around its outside periphery; the second is the oil ring with grooves, i.e. there are grooves provided in the outside circumferential surface of this kind of oil ring; the third kind is a combination ring made of steel, which consists of two disc rings and one liner spring. All these three kinds of oil ring have the common drawbacks: the rings opening becomes larger as a result of wear between the rings outside circumferential surface and the cylinder wall; loss of oil and gas occurs as the rings moving tip and down axially in the ring grooves, this in turn reduces service life of piston ring.

CONTENT OF THE INVENTION

It is the object of this invention to provide an oil sealing ring especially the one used in piston of internal combustion engine or compressor, the ring according to present invention can avoid leakage of oil and gas resulting from the rings opening which becomes larger during the operation and the rings axial movement in the grooves, and then prolong the service life of piston ring.

To achieve the above object, an oil sealing ring provided according to the invention comprises a base ring with a split, and a spring ring disposed on the inner circumferential surface of the base ring, an annular flange extending radially and outwardly is formed on the upper part of the outside circumferential surface of the base ring, and an annular projection extending axially and upwardly is formed on the inside upper surface of the base ring, at least one disc ring is provided around the outside periphery of the projection with the splits of the disc ring and the split of the base ring staggered with each other.

The thickness of the disc ring is equal to the height of the projection, and its external diameter is equal to the external diameter of the flange, said disc ring consists of two pieces.

The angle at which the splits of the disc ring and the splits of the base ring are staggered with each other is in the range of 120° to 180°.

In an alternative embodiment of the present invention, the oil sealing ring comprises a base ring with a split, and an annular flange extending radially and outwardly is formed on the upper part of the outside circumferential surface of the base ring, an annular projection extending axially and upwardly is formed on the inside upper surface of the base ring, at least one disc ring is provided around the outside periphery of the projection with the splits of the disc ring and the split of the base ring staggered with each other, the lower part of the inner circumferential surface of the base ring is a tapered surface, the angle between the tapered surface and horizontal is: ranged from 45° to 85°, and an enhancive ring is provided in contact with the tapered surface.

An annular flange extending radially and inwardly is formed on the upper part of the inside circumferential surface of the base ring, the tapered surface is arranged below said flange along axial direction, the enhancive ring located on the lower part of the tapered surface is in contact with the tapered surface.

Spacer rings are disposed under the enhancive ring.

The enhancive ring is a spiral spring or a snakelike spring that has a "V" shape section vertical to its longitudinal direction.

Liner springs are disposed on the bottom of the base ring, the liner spring is an undulated circular reed with its top and bottom surfaces being symmetrical about its center line.

The oil sealing ring provided according to a further embodiment of the invention comprises a base ring with a split, and a spring ring disposed on the inner circumferential surface of the base ring, an annular flange extending radially and outwardly is formed on the upper part of the outside circumferential surface of the base ring, and through recesses extending radially and oppositely are disposed on the two ends of the base ring at the split; an arc sealing segment is provided with its inserting part inserted into the recesses.

The arc sealing segment comprises an inserting part and an upper sealing part that are disposed oppositely and in parallel on the two ends of the connecting part, the curvature of the arc sealing segment is the same as that of the base ring at the split.

Liner springs are disposed on the bottom of the arc sealing segment, the liner spring is an undulated circular reed with its top and bottom surfaces being symmetrical about its center line.

Spacer rings are disposed under the liner ring:

According to a further embodiment of the present invention, the oil sealing ring provided comprises a base ring with a split, and an annular flange extending radially and outwardly is formed on the upper part of the outside circumferential surface of the base ring, an annular projection extending axially and upwardly is formed on the inside upper surface of the base ring, at least one disc ring is provided around the outside periphery of the projection with the splits of the disc ring and the split of the base ring staggered with each other, the lower part of the inner circumferential surface of the base ring is a tapered surface, the angle between the tapered surface and horizontal is ranged from 45° to 85°, and a component ring is provided in contact with the tapered surface under the base ring, and an radial elastic liner spring so provided exerts radial force to the component ring, there are radial holes used as lubrication passages on the liner spring.

The upper surface of the component ring is a tapered surface which cooperates with the inner tapered surface of the base ring.

According to a still further embodiment of the present invention, the oil sealing ring provided comprises a base ring and a disc ring stacked on said base ring, the splits of the base ring and the disc ring are staggered with a angle of 180° between them, and an elastic liner spring for supporting each of the above rings.

The cross-section of the elastic liner spring is a "U" shape section a flange is disposed vertically on one leg of the "U" shape, and grooves provided on the two legs of the "U" shape and the flange are respectivelly spaced apart with each other.

The elastic liner spring is made of spring steel.

As the disc rings are disposed on the top surface of the base ring of the oil sealing ring provided in the present invention, and the splits of said disc rings are staggered with the split of the base ring, so no axial openings or grooves are formed on the whole annular contacting area between the oil sealing ring and the cylinder wall, thus the reliable sealing is provided. Even though the opening of the base ring becomes larger because of wear, the oil leakage of sealing ring according to the structure of the present invention will not increase.

The contacting area between the oil sealing ring of the present invention and the cylinder wall is smaller than that of the prior art, so the friction is also smaller; as the axial liner springs are provided, the oil sealing ring and the ring groove in the piston ring contacts tightly with each other, thereby not only the axial movements can be eliminated, but also the gas sealing can be obtained, and ring groove wear resulting from the axial movement of the oil sealing ring is reduced; so the oil sealing ring of the present invention can economize fuel oil and lubricating oil, and improve the reliability and endurance of the oil sealing ring.

BRIEF DESCRIPTION OF THE DRAWINGS

The embodiments will now be described with reference to the accompanying drawings of which.

DESCRIPTION OF THE EMBODIMENT

Figure 1:
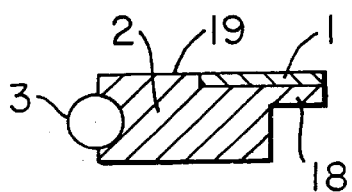
FIG. 1 shows a cross sectional view of an embodiment of the oil sealing ring according to the present invention, in which only a section illustrated, no other parts of the oil sealing ring described in details by way of simplification.

As shown in FIG. 1, the oil sealing ring of the present invention comprises a base ring 2, which has a concentric annular flange 18 on its outside circumferential surface, and an annular projection 19 on its inside circumferential surface, the projection 19 is concentric with the base ring 2 with its inner surface aligned with the inner surface of base ring 2. The flange 18 and projection 19 is integral with the base ring 2, a disc ring 1 is provided outside the projection 19 with its interior diameter corresponding to the external diameter of the projection 19 and its external diameter corresponding to the external diameter of the flange 18 and its thickness corresponding to the height of the projection 19. The base ring 2 and the disc ring 1 shown in the figure are circular rings with splits, as known in the prior art. According to the present invention the base ring 2 and the disc ring 1 are so arranged that their splits are staggered with an angle between them, the angle may be in the range of 120° to 180°, 180° is perfect(not shown in the figure). This arrangement is carried out in the following other embodiments, so no further description will be given.

A groove is formed in the middle of the inside circumferential surface of the base ring 2 with its section being a hemicycle, and a spring ring 3 is received in the above groove, this is also known in the prior art.

Figure 2:
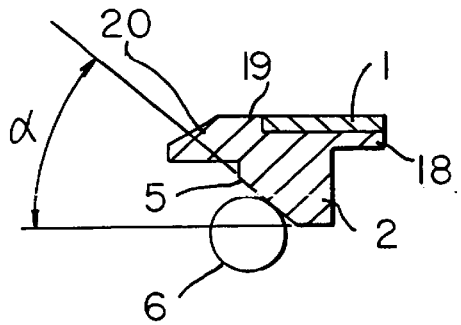
FIG. 2 shows a cross sectional view of the oil sealing ring of another embodiment of the present invention.

In an alternative embodiment shown in FIG. 2, the base ring 2 has the same outside circumferential surface as the base ring of the embodiment shown in FIG. 1, but has a variant inside circumferential surface with a radial flange 20 extending inwardly and formed on its upper part for increasing the integral strength of base ring 2. The flange 20 can be beveled on its top surface as shown in the figure to make it easy to install. A tapered surface 5 is formed on the underside of the inner circumferential surface of base ring 2, an angle α ranged from 45° to 85° lies between the tapered surface 5 and horizontal. The beveled angle can be designed according to the assembling demand. An enhancive ring 6 is provided in contact with said tapered surface 5, the enhancive ring 6 may has the same structure as the above spring ring 3 which can be a spiral spring, however it can be other form, for example, it can be an elastic ring of "V" shape. This kind of the elastic ring can be form by a snakelike spring with its two ends interconnected, said snakelike spring is bent up so that it has a cross section of "V" shape along its longitudinal symmetrical center line. As a result, the elastic ring also has a "V" shape section.

Figure 3:
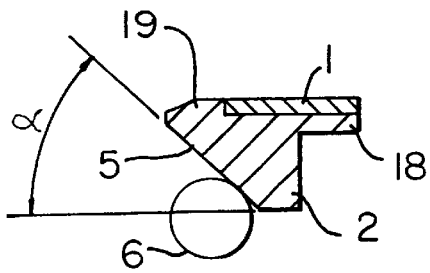
FIG. 3 shows a cross sectional view of the oil sealing ring of an alternative embodiment of the present invention.

FIG. 3 shows a cross sectional view of the oil sealing ring according to a further embodiment of the present invention. The oil sealing ring shown in FIG. 3 has no inside flange 20 as shown in FIG. 2, except for this, it has the same structure as that in FIG. 2.

Figure 4:
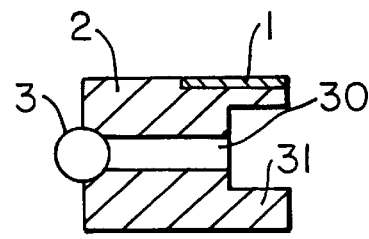
FIG. 4 shows a cross sectional view of the oil sealing ring of a further embodiment of the present invention.

The base ring 2 shown in FIG. 4 is a base ring known in the prior art, in which a lubrication passage 30 is provided and a lower flange 31 is disposed oppositely to the flange for receiving disc ring 1. This kind of ring has a symmetrical section relative to the center line of lubrication passage 30, in other words the present invention can be embodied by manufacturing a groove for receiving disc ring 1 on the known piston ring. So the application of the present invention can be used for reforming and maintenance of the avialable equipments without extra cost.

Figure 5:
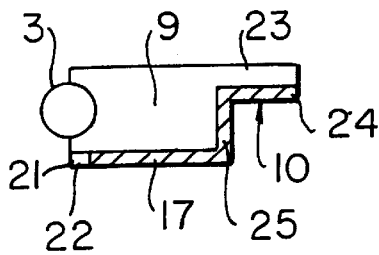
FIG. 5 shows a cross sectional view of the oil sealing ring of a still further embodiment of the present invention, in which an arc sealing segment shown.
Figure 18:
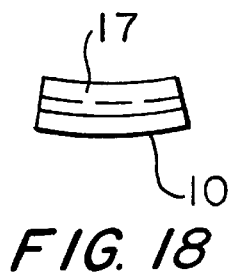
FIG. 18 atop view showing an arc sealing segment of the invention.
Figure 20:
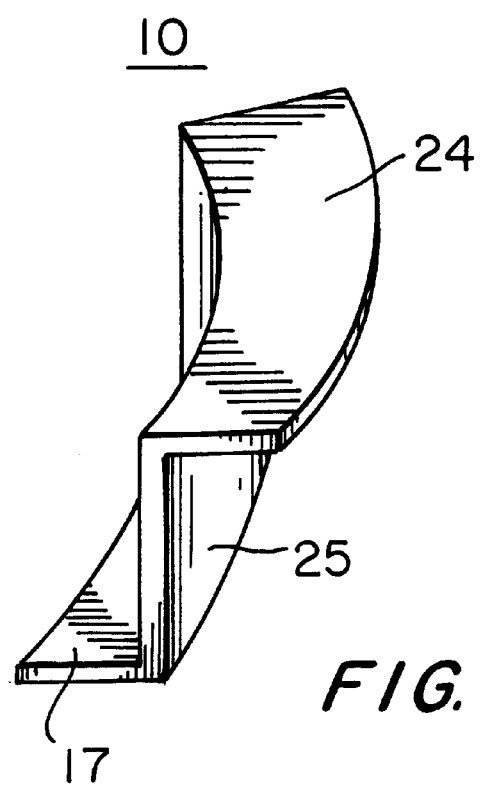
FIG. 20 shows a perspective view of an arc sealing segment in accordance with the present invention.

FIG. 5 shows an oil sealing ring of a further embodiment of the present invention, in which an arc sealing segment is provided instead of a whole disc ring. It can be seen more clearly in FIGS. 18 and 20 that the arc sealing segment 10 being one part of a circle has the same curvature with the base ring 2, so both of them abut against each other. The arc sealing segment 10 comprises an upper sealing part 24 and a lower inserting part 17, which extend in the opposite directions on the two sides of a connecting part 25 and joined together by the connecting part 25. The advantage of this structure is to reduce material cost, to simplify the integral structure of the oil sealing ring, and to simplify the assembly and the maintenance.

Figure 6:
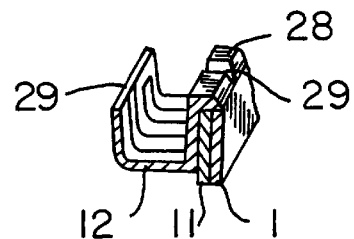
FIG. 6 shows a perspective view of the oil sealing ring of a further embodiment of the invention.

FIG. 6 shows a partial perspective view of the oil sealing ring of a still further embodiment of the invention. The oil sealing ring shown comprises a disc ring 1 which is as same as the disc ring of the above embodiments, and a base ring 11 which is a ring with a split, the disc ring 1 and the base ring 11 are disposed so that their splits are staggered with each other. The oil sealing ring also comprises a liner spring 12 with a "U" shape contour, a flange 28 arranged vertically on one leg of "U" shape liner spring 12 is used to retain disc ring 1 and base ring 11 and apply radial forces on them. As shown in FIG. 6, grooves 29 are disposed oppositely and staggeringly on the two legs of "U" shape liner spring 12 and said flange 28, i.e. the positions of grooves 29 disposed on the two legs and said flange 28 are staggered and spaced with each other. The two legs of "U" shape liner spring 12 apply axial pressure on the above disc ring 1 and the base ring 11, to make the disc ring 1 joined tightly against the ring groove of piston. Thereby it can be seen more clearly that this kind of oil sealing ring can prevent the axial movement of the piston ring, thus reduce wear between them. As the splits of disc ring 1 and base ring 11 are staggered with each other. The oil leakage can be prevented efficiently.

Figure 7:
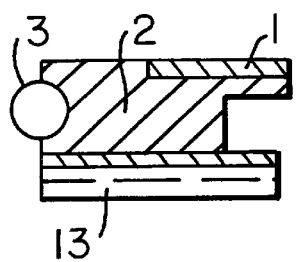
FIGS. 7 to 9 shows respectively the cases of adding liner spring to the oil sealing ring of FIGS. 1, 4 and 5.
Figure 8:
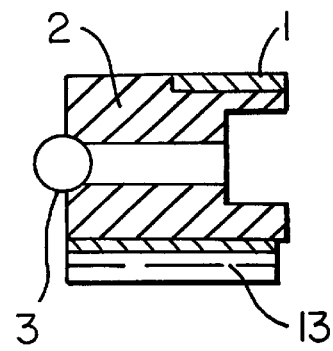
Figure 9:
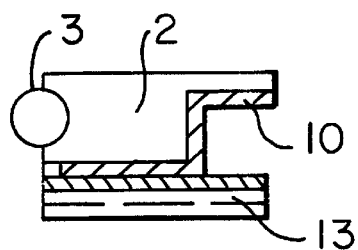
Figure 10:
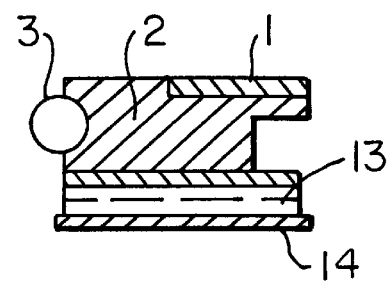
FIGS. 10 to 15 shows respectively the variable embodiments of FIGS. 2 to 6 in which a spacer ring is provided.
Figure 11:
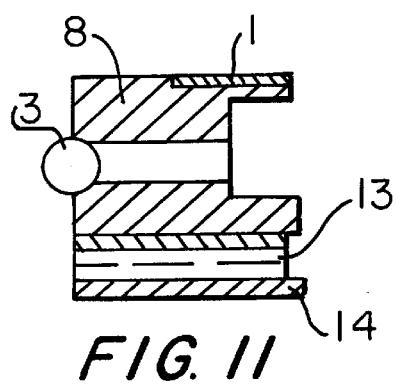
Figure 12:
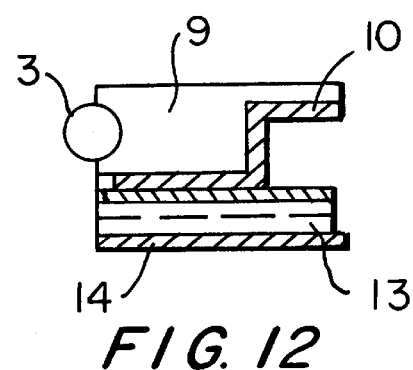
Figure 13:
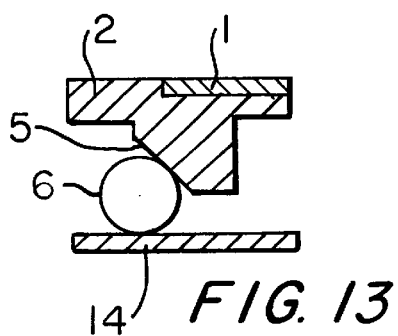
Figure 14:
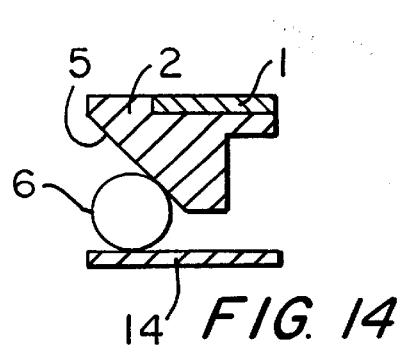
Figure 15:
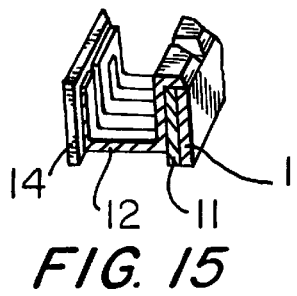

Referring to FIGS. 7 to 9, the cases of adding liner spring 13 to the above embodiments are shown. Said liner spring 13 is an undulated circular reed. The initial tension is obtained between sealing ring and ring groove after initial assembly by disposing the above reed under the base ring, thereby prevent the axial movement of the sealing ring that is likely to occur. The wear between sealing ring and ring groove can be prevented efficiently, thus reduce and weaken the wear engendered in the ring grooves. Liner spring 13 also functions a lubricating oil passage.

FIGS. 10 to 15 show the cases of adding spacer ring 14 to the above embodiments. The spacer ring 14 is a circular ring self-evidently, moreover a circular ring with a split, which has a rectangular section. The spacer ring 14 is used to prevent said enhancive ring 6 or liner spring 1 2,13 from abrading the ring groove directly.

Figure 16:
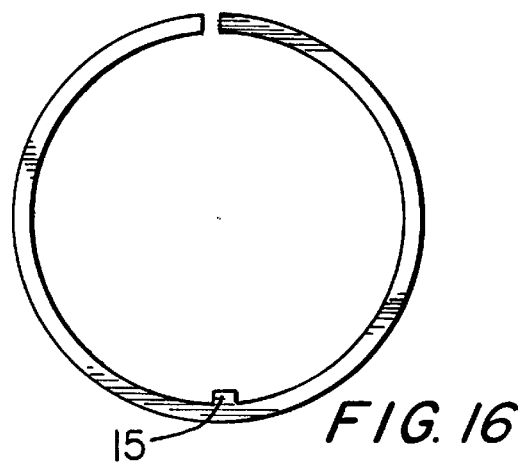
FIG. 16 is a top view of the disc ring according to the invention.

As shown in FIG. 16, the disc ring 1 of the present invention has a location bulge 15 on its inside circumference, a corresponding recess (not shown) is formed on the projection 19 of the base ring 2, so the stationary locations of the disc ring 1 and the base ring 2 are provided by cooperating of said bulge 15 and the recess.

Figure 17:
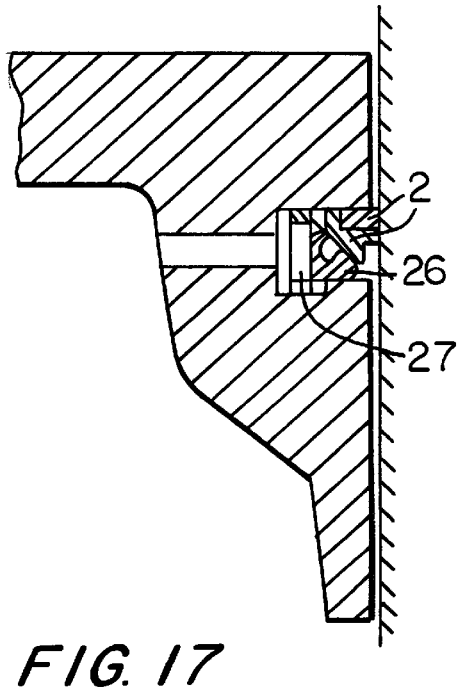
FIG. 17 is partial sectional view showing one embodiment of the invention.

The base ring of a further embodiment shown in FIG. 17 also has an inner tapered surface, however the enhancive ring disposed under the base ring is replaced by a component ring 26. The component ring 26 has a tapered upper surface that cooperates with the inner tapered surface of the base ring 2 and stacks together. Several lubrication passages are through the component ring 26. A radial elastic liner spring 27 is disposed between the component ring 26 and the piston ring groove, the liner spring 27 is formed by a snakelike spring which exerts radial force to the component ring 27, said radial force is divided into a radial component and an axial component with the aid of the tapered surface of the component ring 27 or the base ring 2, thereby the base ring 2 is pushed towards cylinder wall, and any axial movement can be prevented by base ring 2. Said liner spring 27 can be a spring ring 6 mentioned above.

Figure 19:
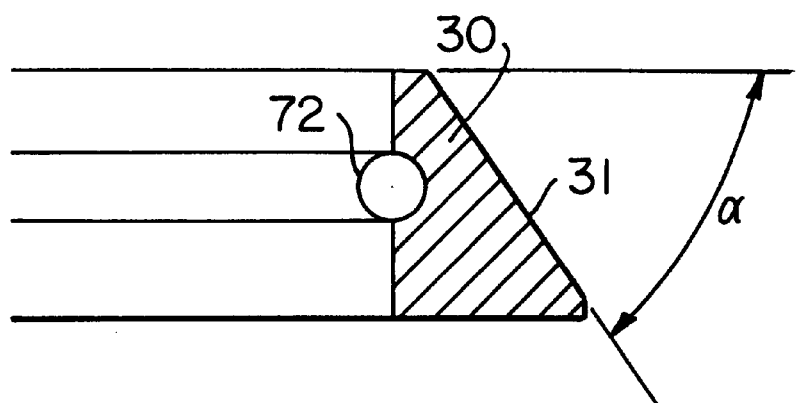
FIG. 19 shows a cross-sectional view of an oil-sealing ring that comprises a tapered ring and an elastic in accordance with the present invention.

The specific embodiment shown in FIG. 19 has an alternative spring ring 6 that comprises a tapered ring 30 and an elastic ring 32. The taper of the tapered ring 30 is equal to the taper of the tapered surface of the base ring 2 and coincident with it. Said elastic ring 32 can be a spiral or a snakelike spring. When said elastic ring 32 is a spiral spring, a recess that has a semicircular section is provided on said tapered ring 30 for receiving the spiral spring. The number 31 shown in the drawing indicates the tapered surface of said tapered ring 30.

It is to be understood that the present invention is not limited to the specific embodiments described above, which is only used to illustrate the invention, many other variations and modifications can be made by the person skilled in the art without departing from the scope of the present invention defined by the appended claims.

What is claimed is:

1. An oil sealing ring comprising a base ring(2) with a split, a spring ring(3) disposed on the inner circumferential surface of the base ring(2), wherein an annular flange(18) extending radially and outwardly is formed on the upper part of the outside circumferential surface of the base ring(2), and an annular projection(19) extending axially and upwardly is formed on the inside upper surface of the base ring(2), at least one disc ring(1) is provided around the outside periphery of the projection(19) with the splits of the disc ring(1) and the split of the base ring(2) staggered with each other.

2. An oil sealing ring as in claim 1, wherein the thickness of the disc ring(1) is equal to the height of the projection(19), and its external diameter is equal to the external diameter of the flange(18), said disc ring(1) consists of two pieces.

3. An oil sealing ring as in claim 1, wherein the angle at which the splits of the disc ring and the splits of the base ring are staggered with each other is in the range of 120° to 180°.

4. An oil sealing ring as in claim 1, 2 or 3, wherein liner springs(13) are disposed on the bottom of the base ring(2), the liner spring(13) is an undulated circular reed with its top and bottom surfaces being symmetrical about its center line.

5. An oil sealing ring comprising a base ring(2) with a split, wherein an annular flange(18) extending radially and outwardly is formed on the upper part of the outside circumferential surface of the base ring(2), and an annular projection(19) extending axially and upwardly is formed on the inside upper surface of the base ring(2), at least one disc ring(1) is provided around the outside periphery of the projection(19) with the splits of the disc ring(1) and the split of the base ring(2) staggered with each other, the lower part of the inner circumferential surface of the base ring(2) is a tapered surface, the angle between the tapered surface and horizontal is ranged from 45° to 85°, and an enhancive ring(6) is provided in contact with the tapered surface.

6. An oil sealing ring as in claim 5, wherein an annular flange(20) extending radially and inwardly is formed on the upper part of the inside circumferential surface of the base ring(2), the tapered surface is arranged below said flange(20) along axial direction.

7. An oil sealing ring as in claim 5 or 6, wherein spacer rings(14) are disposed under the enhancive ring(6).

8. An oil sealing ring as in claim 5 or 6, wherein the enhancive ring(6) is a spiral spring or a snakelike spring that has a "V" shape section vertical to its longitudinal direction.

9. An oil sealing ring as in claim 5, wherein the enhancive ring(6) comprises a tapered ring(30) and an elastic ring(32).

10. An oil sealing ring as in claim 9, wherein the tapered ring(30) has identical tapered surface with the base ring(2) and keeps in contact with the base ring(2), the elastic ring(32) can be a spiral spring or a snakelike spring with a "V" shape section.

11. An oil sealing ring comprising a base ring(9) with a split, a spring ring(3) disposed on the inner circumferential surface of the base ring(9), wherein an annular flange(23) extending radially and outwardly is formed on the upper part of the outside circumferential surface of the base ring(9), and through recesses (21,22) extending radially and oppositely are disposed on the two ends of the base ring(9) at the split; an arc sealing segment(10) is provided with its inserting part(17) inserted into the recesses(21,22).

12. An oil sealing ring as in claim 11, wherein the arc sealing segment(10) comprises an inserting part (17) and a upper sealing part(24) which are disposed oppositelly and in parallel on the two ends of the connecting part(25), the curvature of the arc sealing segment(10) is the same as that of the base ring(9) at the split.

13. An oil sealing ring as in claim 11 or 12, wherein liner springs(13) are disposed on the bottom of the arc sealing segment(10), the liner spring(13) is an undulated circular reed with its top and bottom surfaces being symmetrical about its center line.

14. An oil sealing ring as in claim 13, wherein spacer rings(14) are disposed under the liner ring(13).

15. An oil sealing ring comprising a base ring(11) and a disc ring(1) stacked on said base ring(11), wherein the splits of the base ring(11) and the disc ring(1) are staggered with an angle of 180° between them, and an elastic liner spring (12) for supporting each of the above rings, the cross-section of the elastic liner spring(12) is a "U" shape section, a flange(28) is disposed vertically on one leg of the "U" shape, and grooves(29) provided on the two legs of the "U" shape and the flange(28) are respectively apart with each other.

* * * * *